G. VANDERHOOF.
Car Truck.

No. 7,094.

2 Sheets—Sheet 1.

Patented Feb. 12, 1850.

Point of Draught

G. VANDERHOOF.
Car Truck.

No. 7,094.

2 Sheets—Sheet 2.

Patented Feb. 12, 1850.

UNITED STATES PATENT OFFICE.

GEORGE VANDERHOOF, OF PATERSON, NEW JERSEY.

CONNECTING TRUCKS WITH CAR-BODIES.

Specification of Letters Patent No. 7,094, dated February 12, 1850.

*To all whom it may concern:*

Figure 1:
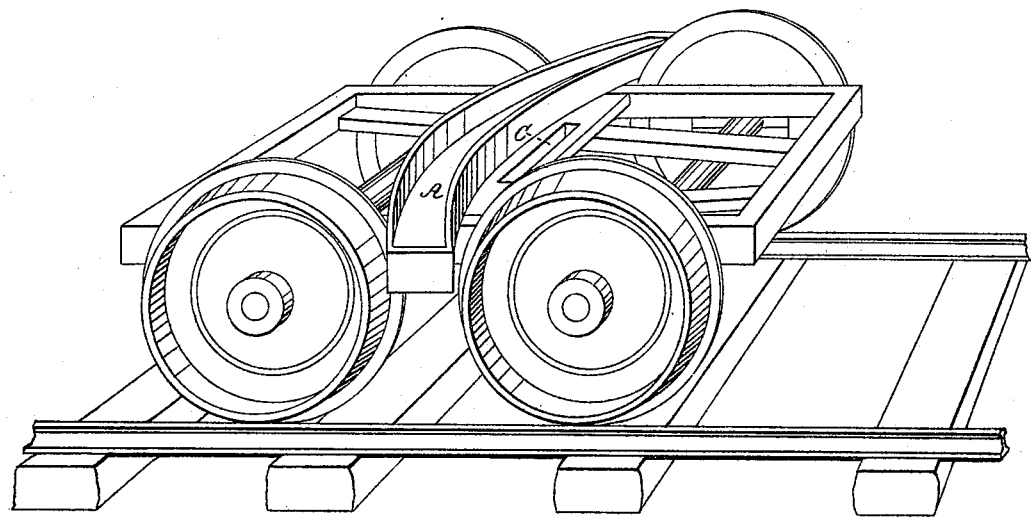
Figure 2:
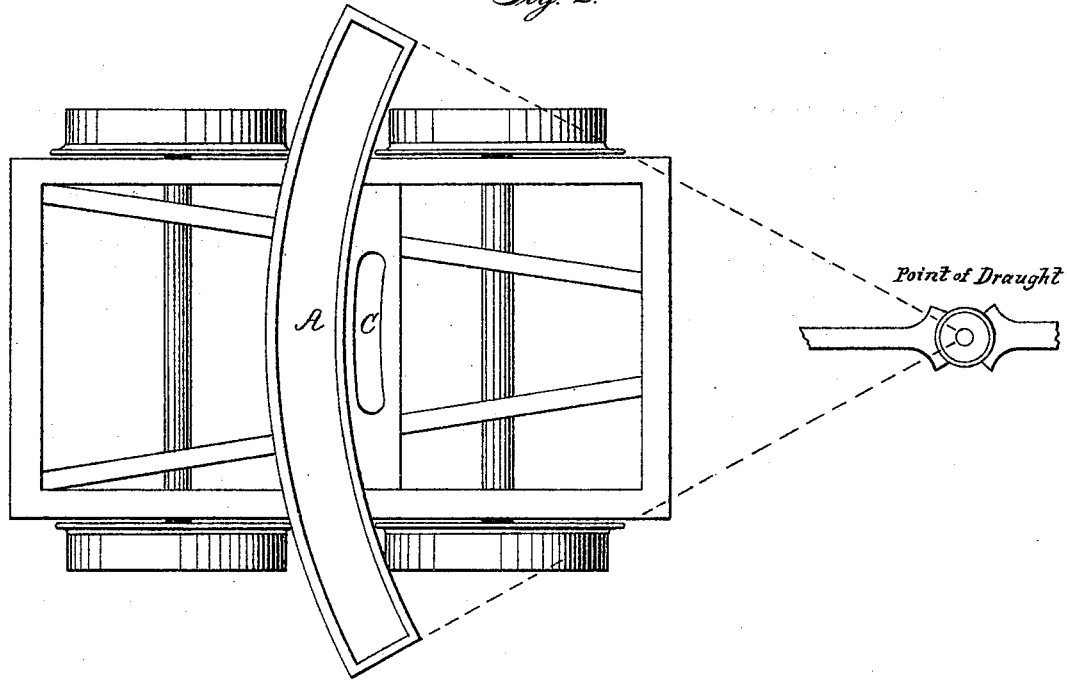
Figure 3:
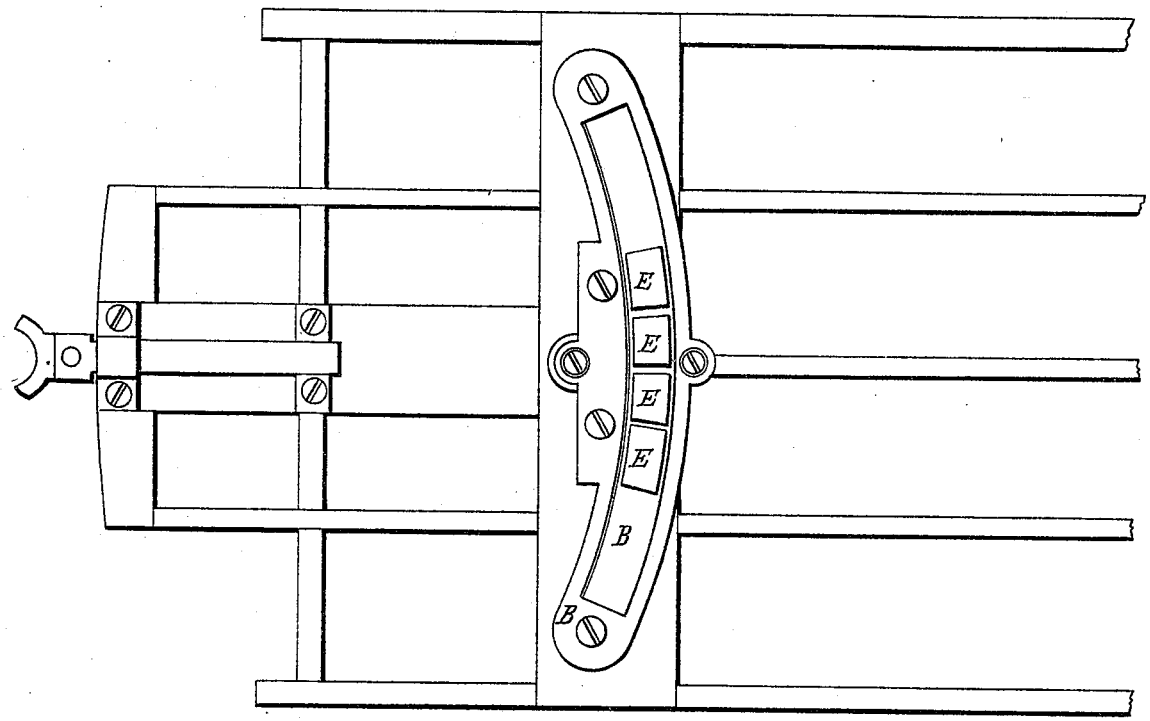
Figure 4:
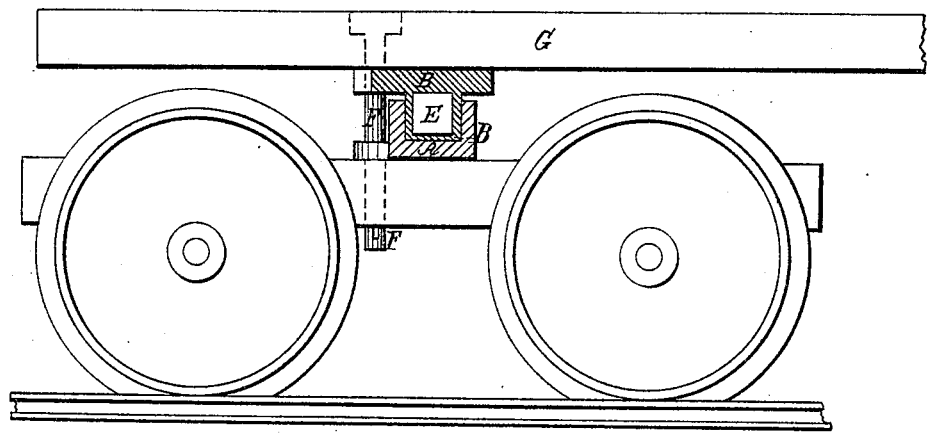

Be it known that I, GEORGE VANDERHOOF, of Paterson, in the county of Passaic and State of New Jersey, have invented a new and useful improvement in connecting car-bodies with trucks on railroads, the apparatus being called the "segment-traverse;" and I hereby declare the following is a full and exact description.
To enable others to make and use my invention I proceed to describe its construction and operation reference being had to two sheets of drawings hereunto annexed and making part of this specification.
Figure 1, perspective view of a truck upon which the channel or trough, A, is placed. It is in plan the segment of a circle whose center is the point of draft. Fig. 2 plan of the same. Fig. 3 under side view, in plan, of a car body or frame showing the rail or slide, B, which sits in the trough, A. Fig. 4 side elevation of a truck and part of a car body, G, between which is seen a section of the segment traverse A and B.
I construct this "traverse" as follows: Upon a truck and between the two pairs of wheels I lay crosswise a piece of cast iron, (generally about seven feet long) constituting a trough, the bottom and sides of which are made smooth, excepting a space of the bottom at the middle, which it is not necessary to polish. This trough, A, is in plan, the segment of a circle, whose center is the point of draft (or point of connection between the cars) see Fig. 2. It may in depth and width be a few inches—say four or five. Connected with this trough, or with the frame of the truck, is the sloat, C, in which the king bolt, (F, Fig. 4) traverses. The king bolt serves only the purpose of connecting the car body with the truck, and plays back and forth in the sloat. The truck being thus prepared with the trough and the sloat it is ready for the reception of the car body. On the under side of the car body, Fig. 3, the rail or slide is placed. This rail, B, is made to fit into the trough, so as to slide easily from end to end. It is about a foot shorter than the trough. This rail or slide, B, is attached to the under side of the car body by bolts through the flat bed of iron upon which it is raised. The raised part which fits into the trough is made hollow, see Figs. 3 and 4, and has a bearing only on its ends, see Fig. 3. The middle portion is cut away so as to make room for oil, a quantity of which can be put into the trough at once sufficient to last six months or more. The body being put upon the truck, with the slide set into the trough and the king bolt, F, (which is about two feet in length) passed through the body of the car and down through the sloat, C, and keyed in place, the connection is complete. The effect of this segment traverse is to obviate friction of the flanges of the wheels upon the sides of rails. When the locomotive begins to turn a curve it brings the point of draft in the direction of the curve and instantly turns the truck also in the direction of the curve. The point of draft is always kept in the center of the track. The trucks therefore always follow the line of the track whatever may be the curve, being constantly directed to it by the point of draft. By this arrangement the difficulty attending a fixed center or king bolt is obviated.
What I claim as my invention and desire to secure by Letters Patent is—

The mode of attaching car bodies to trucks by means of the trough, A (with the sloat C, and king bolt, F,) and the rail B, constituting the segment traverse, as above described.

GEORGE VANDERHOOF.

Witnesses:
AND. MEAD,
J. H. DAY.